US005643999A

United States Patent [19]
Lee et al.

[11] Patent Number: 5,643,999
[45] Date of Patent: Jul. 1, 1997

[54] CO-EXTRUDABLE ADHESIVES WITH GOOD AGE-DOWN RESISTANCE

[75] Inventors: I-Hwa Lee; Timothy Alan Libert, both of Wilmington, Del.

[73] Assignee: E. I. du Pont de Nemours and Company, Wilmington, Del.

[21] Appl. No.: 413,033

[22] Filed: Mar. 28, 1995

[51] Int. Cl.$^6$ .......................................................... C08F 8/00
[52] U.S. Cl. ........................... 525/193; 524/528; 525/74; 525/78; 525/240
[58] Field of Search ........................ 525/193, 240, 525/74, 78; 524/528

[56] References Cited

U.S. PATENT DOCUMENTS

| | | | |
|---|---|---|---|
| 3,868,433 | 2/1975 | Bartz et al. | 260/876 R |
| 4,198,327 | 4/1980 | Matsumoto et al. | 260/4 |
| 4,440,911 | 4/1984 | Inoue et al. | 525/301 |
| 4,684,576 | 8/1987 | Tabor et al. | 428/441 |

FOREIGN PATENT DOCUMENTS

| | | |
|---|---|---|
| 0479457 | 4/1992 | European Pat. Off. . |
| 0495996 | 7/1992 | European Pat. Off. . |
| 59-179543 | 10/1984 | Japan . |

*Primary Examiner*—Paul R. Michl
*Assistant Examiner*—U. K. Rajguru
*Attorney, Agent, or Firm*—Peter A. Fowell

[57] ABSTRACT

Co-extrudable adhesive compositions which have excellent adhesion, and which bond well to ionomers, even after long aging, are formed by blending polyethylene with a very low density of 0.86 to 0.91 with polyethylene having a density of 0.91 to 0.935, together with a hydrocarbon elastomer. Acid grafting of any of the components is preferably present. More than an insubstantial amount of polyethylene with higher density than 0.935 is deleterious to initial or age-down peel strength of the adhesive ionomer bond, and is not part of the adhesive composition.

5 Claims, No Drawings

CO-EXTRUDABLE ADHESIVES WITH GOOD AGE-DOWN RESISTANCE

BACKGROUND OF THE INVENTION

1. Field of Invention

The present invention relates to co-extrudable adhesive compositions suitable for composite structures of barrier layers and structural layers, and specifically for ionomer heat-seal structural layers. More particularly, it relates to co-extrudable adhesives based on a blend of two polyethylenes one of which is very low density polyethylene, blended with a hydrocarbon elastomer. All components may optionally be acid grafted. Such adhesives provide bonds to ionomers which are both strong, and which do not 'age-down'.

2. Description of Related Art

Commercial packaging applications often employ composite structures of multiple layers of thermoplastic polymers. These composite structures typically include barrier layers for water, oxygen or other substances, and structural layers bound together by an adhesive or 'tie layer'. The inner structural layer may also serve as a heat-seal layer allowing ready bonding to itself. The barrier layers may be polar materials particularly suitable for oxygen barriers such as ethylene/vinyl alcohol copolymer or nylon, or non-polar water barriers such as all hydrocarbon polyolefins. Heat-seal layers are commonly ethylene copolymers. Ionomers, particularly sodium ionomers, have particularly desirable heat-seal properties.

Composite structures are often made by extrusion processes. In such processes, the adhesive is applied to the structural layers in the molten state. Commonly, one or more structural layers is also extruded in the molten state. When adjacent layers are simultaneously extruded from the melt, the process is known as co-extrusion, and adhesives useful for the process as co-extrudable adhesives.

Co-extrudable adhesives which are useful for bonding barrier polymer layers are well known. Polar polymers such as ethylene/vinyl acetate copolymers can be used as adhesives to bond many polymers to ionomer. However adhesives based on acid modified polyethylene are superior in organoleptic properties, in applications requiring exposure to elevated temperatures, and are generally superior in bond strength, to polar barrier polymers such as ethylene/vinyl alcohol. Such acid modified polyethylene based co-extrudable adhesives may also be toughened with elastomers.

Even so, such co-extrudable adhesives tend to be problematical when used to bond barrier layers to ionomer because, while they bond to barrier resins such as ethylene/vinyl alcohol, they tend either to provide poor bonds to ionomer or to produce bonds that, while strong initially, tend to drop off rapidly with time (age-down) or drop off in aggressive environments. This is particularly true when are ionomer is the commonly used sodium ionomer.

U.S. Pat. No. 4,198,327 (Matsumoto et al.) discloses a composition having improved adhesion to solid polar materials which comprises a modified crystalline polyolefin having an X-ray crystallinity of at least 25%, and not more than 10 mole % comonomer, the polyolefin having grafted thereto a monomer such as an unsaturated carboxylic acid or it derivative, the composition additionally containing a hydrocarbon elastomer. The elastomer is disclosed as necessary to provide initial and durable adhesion, and works only when the polyethylene is acid grafted. Among the extensive number of polar materials listed, ionomer resins are not included. No very low density polyethylene having less than 25% X-ray crystallinity is included in the adhesive. The elastomers appear to be uncured.

U.S. Pat. No. 3,868,433 (Bartz et al.) discloses polyolefins generally, graft modified with acids, and which may also contain elastomers, for use as hot-melt adhesives.

U.S. Pat. No. 4,684,576 (Tabor et al.) discloses adhesive blends based on grafted high density polyethylene of density 0.94 to 0.965 containing linear low density polyethylene of density 0.88 to 0.935, for use as adhesives. No elastomer is present. The adhesive of the present invention can not contain any high density polyethylene.

European Patent Publication No. EP 0,495,996 A1 also discloses a blend of a high density polyethylene of density greater than 0.935 which may be acid grafted, and a linear low density polyethylene which may have a density of either 0.910 to 0.935 which may also be grafted, or a density of 0.890 to 0.910 (referred to also as a linear very low density polyethylene), or both, which has good adhesive behavior when used with ethylene/vinyl alcohol, polyesters, and certain metals.

European Patent Publication No. EP 0. 479,457 also discloses a polyolefin adhesive composition comprising a high density polyolefin of density 0.935 or higher grafted with acid, and containing a very low density polyethylene of density 0.86 to 0.915. The composition may contain, but is preferably free of hydrocarbon 'rubbers'. Adhesivity to steel, and to polar substrates, especially polyamides and ethylene/vinyl alcohol polymers is disclosed. The present invention can not contain polyethylenes having a density greater than 0.935.

There is a need for thermoplastic co-extrudable adhesives which have the specific ability to bond to ionomers with a high level of permanence in the bonding, to allow ionomers to be used more readily as heat-seal layers in durable multilayer packaging films.

SUMMARY OF THE INVENTION

The present invention provides a melt-processible co-extrudable polyethylene based adhesive composition which is ideally suited to providing durable bonds to ionomer resins. The composition contains both 'very low density polyethylene', and a 'hydrocarbon elastomer', but can not contain any polyethylene component having a density greater than about 0.935.

According to the present invention, there is provided an adhesive composition suitable for providing durable bonds to ionomers, comprising:

(A) 70–95 weight %, based on (A) plus (B), of a blend of polyethylene polymers, the blend consisting essentially of:

(a) 5–40 weight percent, based on (A), of a first polyethylene polymer having a density of 0.86 to below 0.91 g/cc, and a heat of fusion, based on differential scanning calorimetry, DSC, of greater than 30 joules/gram, the polymer produced by other than free-radical means, (b) 60–95 weight percent, based on (A), of a second polyethylene polymer having a density of 0.91 to 0.935, and (B) 5–30 parts based on (A) plus (B), of a hydrocarbon elastomer having a heat of fusion, based on DSC, of less than 25 joules/gram, wherein any portion of (a), any portion of (b) and any portion of (B) may be modified by grafting with a carboxylic acid or derivative, with the proviso that the total weight percent of acid or acid derivative in the final adhesive composition does not exceed 3 weight percent.

The invention further provides for a multilayer structure comprising at least one barrier layer bonded to an ionomer layer.

DETAILED DESCRIPTION OF THE INVENTION

The term 'polyethylene polymer' as used here, includes homopolymers of ethylene and copolymers of ethylene with other hydrocarbon alpha-olefins having from 3 to 20 carbon atoms, produced either by free-radical polymerization techniques or by other techniques such as Ziegler-Natta or Metallocene catalysis, and includes all such polymers having a heat of fusion based on DSC of greater than 30 joules/gram. They typically show a DSC maximum peak melting point between 100 and 140 deg. C. corresponding to typical polyethylene crystallinity, free-radical polymer and lower density polymers melting lower than linear higher density polymers.

Polyethylene polymers are commonly referred to by terms which depend on the density. The terms include low density polyethylene (LDPE) which acronym is usually reserved for polymer produced by free-radical initiation of polymerization and usually contains no comonomer; high density polyethylene (HDPE) which is linear and produced by co-ordination or other metal catalysis and may be a homopolymer or copolymer; medium density polyethylene (MDPE) containing more comonomer, though MDPE may be a blend of HDPE and LDPE; linear low density polyethylene (LLDPE), which is always a copolymer of ethylene and an a-olefin, and which in common terminology can include (linear) very low density, sometimes called ultra low density polyethylene (VLDPE or ULDPE) which may be produced by co-ordination (Ziegler-Natta) catalysis as well as Metallocene catalysis.

The density ranges for these differently termed polyethylenes is not rigidly defined in the art. Thus a polyethylene with a density of 0.89 made by Ziegler-Natta type co-ordination catalysis is often referred to both as LLDPE and VLPDE. Likewise, the density limit between high density polyethylene (HDPE) medium density polyethylene MDPE, and LDPE is also vague. Thus either the terms have to be first defined in terms of density ranges, or the materials merely referred to directly only by density ranges. For the purposes of the claims in this invention, the polyethylenes will be defined by their density range and other relevant numbers such as heat of fusion when this is critical. In the disclosure, for convenience in general discussion, polyethylenes having a density from 0.91 to 0.935 produced by free-radical polymerization will be referred to as LDPE; linear polyethylenes with density from 0.86 to below 0.91 produced by non free-radical means will be referred to VLDPE; linear polyethylenes produced by non free-radical means having a density from 0.86 to 0.935 will be referred to as LLDPE—and thus include the VLDPEs; and polyethylenes with density greater than 0.935 and produced by non-free radical means as HDPE. The term MDPE will not be used. Ingredient A/(a) is thus VLDPE and LLDPE. Ingredient A/(b) may be LDPE or LLDPE, but is not VLDPE.

The terms 'elastomer' and 'rubber' are often used interchangeably, though the term elastomer is sometimes reserved for synthetic materials and rubber for natural material. The adjectives 'raw', 'green' and 'uncured' when qualifying these materials means they have not been 'cured' or crosslinked. When the terms elastomer and rubber are used with no qualification, they sometimes refer to cured materials and sometimes uncured. Uncured materials do not have the resilience and characteristic properties associated with cured materials, except in the case of 'thermoplastic elastomers', where at use temperatures molecular associations (e.g. crystalline or glassy domains) occur which approximate the effect of crosslinking. The materials of the adhesive compositions of this invention are uncured. They may however be thermoplastic elastomers. The fluidity of uncured material is necessary for the adhesive compositions to flow adequately during adhesive application. Antioxidants, which aid in preventing premature cure are desirable in the uncured materials. Of course, once the adhesive compositions have been used as adhesives, subsequently, they may, for various reasons, develop a degree of crosslinking if crosslink sites are available.

The term 'hydrocarbon elastomer' of this invention is defined as an uncured hydrocarbon polymer having a heat of fusion, based on Differential Scanning Calorimetry DSC, of less than 25 joules/gram. Often such elastomers show no melting endotherm, but if such materials show an endotherm, peak melting point using DSC, is usually below about 55 degrees C., and polyethylene type crystallinity, as indicated by endotherms in the 100 to 140 deg. C. range is essentially absent. Of course, since similar preparative methods and ingredients may be employed to prepare hydrocarbon elastomer and the VLPDE (as for instance for ethylene/propylene copolymers), specific synthesis conditions during polymerization could produce a hybrid blend of VLDPE and a hydrocarbon elastomer as defined above. The hydrocarbon elastomers of this invention include copolymers of ethylene and alpha olefins having from 3 to 20 carbon atoms, as well as other elastomeric polymers including styrene-butadiene, styrene ethylene-butene styrene, polyisobutylene, polybutadiene, natural (uncured) 'rubber' and the like.

It will be apparent to those skilled in the art, that when ethylene is copolymerized with an alpha-olefin, using either conventional Ziegler-Natta or related type catalysts or by the newer Metallocene catalysts, that there can be a composition, property and density continuum, depending on the amount of comonomer and the precise polymerization conditions, all the way from highly crystalline polymers with little comonomer, to very low or non-crystalline polymers with a large amount of comohomer, the latter falling into the category of elastomers (before cure). Thus when propylene is the comonomer, as it commonly is in commercially materials, ethylene/propylene copolymers may be crystalline polymers of varying degree such as the VLDPE or LLDPE polymers of this invention, or low to zero crystallinity ethylene propylene elastomers which may be a 'hydrocarbon elastomer' of this invention. Both VLDPE and ethylene propylene elastomers are amenable to polymerization using the same type of catalysts under very similar conditions, and differ structurally principally only by the amount of comonomer. Thus, both may be produced by Ziegler-Natta catalysis. The amount of comonomer affects the amount of crystallinity and resulting properties.

As long as such low or zero crystallinity 'elastomeric' copolymers remain uncured, property differences from higher crystalline 'polyethylene polymers' depend largely on the degree of crystallinity. When cured however, they become significantly different in properties, most especially in recovery behavior. However, the hydrocarbon elastomers of the adhesive compositions of this invention are, as noted above, uncured. When the same comonomer is used, such as propylene, absent a precisely defined distinguishing characteristic, there would be a continuum of polymer compositions between a VLDPE and ethylene propylene elastomers. Since both are different ingredients of this invention, (ingredient A/(a) and ingredient B), it is critical to define the limits of each in specific numerical terms, so they are clearly distinguished.

Ingredient (A)/(a) has a density of from 0.86 to below 0.91, preferably from 0.86 to 0.90, and has a heat of fusion, based on DSC, of greater than 30 joules/gram. Because heat of fusion, as measured by DSC can vary depending on the prior heat history of the sample, the rate of heating, and the precise way the endotherm curve is integrated, it is essential to define precisely the DSC method on which the limiting heat of fusion values depend. The method used follows ASTM D-1438 (1982), reapproved 1988. The polymer is heated at 10 deg. C. per minute under nitrogen, then held at 150 deg. C. for 10 minutes. It is then cooled at 10 deg. C. per minute to −25 deg. C. under nitrogen. The sample is then immediately reheated at 10 deg. C. per minute to 150 deg. C. under nitrogen. Calculation of the heat of fusion is based on the area of the endotherm from 25 deg. C. to the point of complete melting. That is to say a line is drawn from the point on the DSC curve corresponding to 25 deg. C. to the point corresponding to complete melting, and the area between the line and the curve integrated to obtain the heat of fusion.

The polyethyene polymer (A)/(a) ingredient may by made by the well known conventional Ziegler-Natta catalysis or by Metallocene catalysis or any other similar non free-radical type catalysis Such polymers may differ in comonomer distribution, and in molecular weight distribution. However, provided the density and heat of fusion falls within the required limits, all such resins are suitable. When the terms LLDPE and VLDPE are used, it is to be understood that the polymer may be produced by any such non free-radical catalytic methods.

The hydrocarbon elastomer, ingredient B, is any uncured (non-crosslinked) hydrocarbon elastomer having a heat of fusion of less than 25 joules/gram, measured in the same way as that for ingredient A/(a). For many elastomers, the heat of fusion will be below 10 joules/gram, many having no measurable heat of fusion at all. However, certain of the ethylene/alpha olefin copolymer elastomers of this invention may have a heat of fusion approaching 25 joules/gram. Any elastomer having crystallinity in the above specified range is suitable, but preferably the heat of fusion will be below 20 joules/gram, and most preferably below 15 joules/gram The density of the elastomer however will vary depending on its type and composition, so no density limitation is given for it.

A guide to the level and nature of the crystallinity for ingredient A/(a) and B of this invention may be obtained either by comparison of DSC endotherms with those calculated for an idealized 100% crystalline polyethylene homopolymer resin, or by using X-ray techniques. It is fairly difficult to give precise numbers because different techniques and comparisons can give somewhat different numbers, but for the VLDPE A/(a) with density of 0.86 to 0.91, the crystallinity level is probably in the range of 10 to 30%. This might correspond to a comonomer level of about 25 to 8 weight percent when propylene is comonomer. The preferred density of 0.86 to 0.90 corresponds to a crystallinity level of perhaps about 10 to 25%. This might correspond to a comohomer content probably from about 20 to 10 percent for propylene comonomer. The actual amount of comonomer for a given level of crystallinity will depend on which of the C3 to C20 alpha-olefins is used as well as on the precise polymerization conditions. By contrast, the crystallinity of the elastomer is generally probably less than 8%, often less than 5% and may often be virtually zero. However, a slight amount of crystallinity, above about 2% can be helpful in ease of handling and manufacture of the elastomer, particularly with respect to ease of pelletization.

These values for crystallinity, and comonomer content are merely illustrative, aimed at providing some sort of feel for the nature of the materials of the invention, and should not be considered limiting. The claimed limits on the ingredient are based solely on density and heat of fusion.

The melt index of A/(a) is from about 0.1 to 100 g/10 minutes, preferably about 0.3 to 50 g/10 minutes and most preferably from 0.5 to 35 g/10 minutes (ASTM D-1238, 190 deg. C., with a 2160 g. load) The preferred C3–C20 alpha-olefin comonomers are propylene, butene, hexene and octene with butene and octene being most preferred. There may be more than one comonomer.

Ingredient A/(b) is either a conventional free-radical polymerized LDPE or an LLDPE which is an ethylene copolymer with a C3–C20 alpha-olefin comonomer, and having a density of 0.91 to 0.935. It is preferably an LLDPE, in which case the preferred and most preferred comonomers are the same as for ingredient A/(a). Ingredient A/(b) however will have a higher level of crystallinity, normally but not limited to, higher than 30%.

The presence of HDPE of 0.96 density in the polyethylene polymer component A has been found to drastically reduce even the initial adhesion when added at a level of 12%. Lower levels of even as little as about 2% of a resin with density above 0.935 will detract from the initial adhesion and more than this minimum amount can not be present. The use of the phrase 'consisting essentially of' means that in addition to the named ingredients, small amounts of other components which do not prevent the advantages of the present invention from being realized can also be present. Thus while for some compositions within the invention, very low amounts such as 1% of polyethylene having a density more than 0.935 might still allow a marginally useful composition, as much as 2% of a polyethylene, having a density of above 0.935 will be deleterious when added to most of the compositions of this invention, and any amount above this level is specifically excluded. Acid grafted HDPE of greater than 0.935 density is similarly excluded. This is to be particularly noted, since many adhesive compositions specifically call for the presence of acid grafted HDPE.

The hydrocarbon elastomer is preferably a copolymer of ethylene and a C3–C20 alpha-olefin, and preferably a copolymer of ethylene and propylene or butene or both, most preferably ethylene and propylene. In these cases it may also contain a small amount of hexadiene or norbornadine. Other monomers such as styrene or isoprene or isobutylene or monomers with multiple sites of unsaturation such as butadiene may be the principle monomer or comohomer in the elastomer, and any number of variations or combinations of such monomers may be present. Representative examples include ethylene/propylene, ethylene/propylene/diene (EPDM), ethylene/butene-1, ethylene/butadiene, styrene/butadiene, styrene/ethylene-butene/styrene block copolymer, isobutylene-isoprene, polyisobutylene, polybutadiene, natural 'rubber' and the like.

Any or part of any or all of the ingredients A(a), A(b) and B can be modified with a carboxylic acid or derivative.

However, the total amount of acid or acid derivative in the final adhesive composition should not exceed 3% by weight. The benefits of such grafting for adhesive compositions which are to be bonded particularly with polar polymer substrates are well known. While none of the ingredients have to be grafted in order to bond to ionomer, it is preferred that at least 0.5 weight percent acid, as graft, is present in the composition, since this is particularly advantageous for adhesion to polar substrates such as ethylene/vinyl alcohol, polyamide and polyester. While it is not overly critical which ingredient is so modified, ingredient A/(b) is the preferred ingredient to be modified if such a modified polymer is present. Representative acids which can be used to modify the components of this invention include acrylic acid, methacrylic acid, maleic acid, fumaric acid, citraconic acid, crotonic acid itaconic acid, succinic acid, muconic acid, and their corresponding anhydrides, esters or half esters, amides, imides, and metal salts and the like. Maleic acid and maleic anhydride are well known as preferred acid modifying agents. Methods of modification with carboxylic acids and their derivatives are well-known in the art, and include solution, melt and fluidized-bed techniques.

The co-extrudable adhesives of this invention may be prepared by the common techniques of melt blending by either batch or continuous mixing such as melt extrusion in a single or twin screw extruder, or by using mixing devices such as a Banbury or a roll mill. Melt temperatures will in general be in the range 150 to 250 deg. C.

The composition may also contain small amounts of conventional additives which do not prevent the achievement of durable bonds, especially to ionomer resin. Such additives include fillers, colorants, UV absorbers or antioxidants.

While the composition is specifically designed to provide durable adhesion between ionomer resin layers and barrier or structural layers, they will also be useful for bonding different barrier or structural layers together. Thus they should provide utility for resins such as polyesters, polycarbonates as well as the well known barriers such as ethylene/vinyl alcohol and polyamides. They should also be useful for other polyolefins such as polypropylene and ethylene copolymers containing acrylic monomers such as ethylene/methyl or ethyl acrylate, ethylene/(meth)acrylic acid copolymers and the like.

Testing Methods

Peel Strength was measured using ASTM D1876-72. Prior to evaluating bond strength of the laminates, they were conditioned for at least 24 hours at 25 deg. C. at 50% relative humidity. Peel strength was evaluated, according to the above ASTM method by separating the film at its weakest interface, and testing on an INSTRON tester in the (T) peel configuration, at 12 inches per minute separation rate. The average value of at least 3 specimens was recorded as the peel strength of the sample. In all cases, the weakest interface was between the adhesive layer and the ionomer.

Peel Strength after a given time was measured on the laminate which had been allowed to age at 25 deg. C. and 50% relative humidity.

Peel strength was also measured after submersing the laminate in water at 70 deg. C. for 4 hours. The results are referred to in the tables as peel strength after being water 'treated'.

Melt Index (MI) was measured using ASTM D-1238 at 190 deg. C./2160 grams load. Melt Flow Index was measured under the same conditions except a temperature of 210 deg. C. was used.

EXAMPLES

Adhesive and Laminate Preparation

The adhesive blends tested were prepared by dry blending the ingredients together and feeding this blend to a 30 mm. Werner Pfleiderer twin screw extruder. Melt temperature was in the 225 to 250 deg. C. range. Each of the blends contained 0.1 wt. %. IRGANOX 1010 hindered phenol antioxidant as a stabilizer. The blended compositions were collected as pellets and directly used to prepare blown film laminates.

Three layer laminates were prepared. They were either HDPE/adhesive/ionomer or ethylene-vinyl alcohol copolymer/adhesive/ionomer. The three layers were co-extruded using three 1-inch extruders feeding a Brampton 3 layer blown-film die. The melt temperatures were approximately as follows: HDPE 220 deg. C.; ethylene-vinyl alcohol (EVOH) 230 deg. C.; ionomer 200 deg. C. and the adhesive blend 180–220 deg. C. The compositions of the layers other than the adhesive layer was as follows: HDPE melt index (MI) less than 0.5, density 0.96; EVOH copolymer containing 32 mole % ethylene, melt flow index of 3.0; the ionomer was an ethylene methacrylic acid copolymer having about 10 weight percent methacrylic acid, neutralized to about 50% with sodium ions, and having an MI of 1.3. Thickness of each layer in the blown film was approximately 1.7 mil (thousandths of an inch) for the three layers HDPE, EVOH and ionomer, and the adhesive layer was approximately 0.6 to 0.7 mils thick.

The adhesive components are given in Table 1.

TABLE 1

| ADHESIVE COMPONENTS | | | | | |
|---|---|---|---|---|---|
| Ingredient | | Composition | Density | MI | HF |
| V1 | | Ethylene/butene copolymer | 0.88 | 1.0 | 61 |
| L-1B | Blend of: | 85% Ethylene/butene copolymer | 0.921 | 12.0 | — |
| | | 15% LDPE (free-radical) | 0.920 | 6.6 | — |
| L-2 | | Ethylene/butene copolymer | 0.920 | 1.4 | — |
| L-3 | | Ethylene/butene copolymer | 0.924 | 5.1 | — |
| L-4 | | Ethylene/octene copolymer | 0.917 | 2.3 | — |
| L-5B | Blend of | 90% Ethylene/octane copolymer | 0.919 | 6.0 | — |
| | | 10% LDPE (free-radical) | 0.915 | 15.0 | — |
| L-G1 | Graft: | Ethylene/butene copolymer/0.9% MAH | 0.920 | 1.5 | — |
| E-1 | Elastomer: | Ethylene/propylene/diene(EPDM) | ~0.87 | TH | ~11 |
| E-2 | Elastomer | Ethylene/propylene/diene(EPDM) | — | TH | ~13 |
| H-1 | | Ethylene homopolymer | 0.959 | 5.0 | |

TABLE 1-continued

ADHESIVE COMPONENTS

| Ingredient | | Composition | Density | MI | HF |
|---|---|---|---|---|---|
| H-G1 | Graft: | Ethylene homopolymer/0.9% MAH | 0.959 | 2.0 | |
| H-G2 | Graft: | Ethylene homopolymer/1.0% MAH | 0.957 | 11.0 | |

Component Prefixes:
V indicates VLDPE type;
L indicates LLDPE and LDPE optionally grafted (G), blended (B).
E indicates hydrocarbon elastomer;
H indicates HDPE optionally grafted (G)
TH - too high to measure.
V-1 FLEXOMER 1085 mfg. by U. Carbide Corp.
E-1 EPDM Grade NORDEL 2744, Mfg. by E. I. du Pont de Nemours
E-2 EPDM Grade NORDEL 2722, Mfg. by E. I. du Pond de Nemours
L-1B Blend of SCLAIR 31E mfg. by Novacor, and LDPE grade AT472 mfg. by AT Plastics; L-2 SCLAIR 11E1; L3 SCLAIR 8107; L4 DOWLEX 3374 (Dow Chemical.Corp); L5-B Blend of DOWLEX 2045 AND PE1570 (Du Pont. Co); H-1 SCLAIR 2907.
MAH Maleic Anhydride
HF Heat of Fusion measured as described in disclosure.
Density of grafted polymers given is essentially the same as that of the ungrafted copolymer from which it is made.

TABLE 2

ADHESIVE COMPOSITIONS,: PEEL STRENGTHS OVER TIME

| Ex. | Ingredients (Weight %; Component) | | | | | (Weeks) Peel Strengths, g/in. | | |
|---|---|---|---|---|---|---|---|---|
| 1 | 10; V-1 | 57; L-3 | 18; L-G1 | 15; E-1 | | (1) 1498 | (3) 1567 | (6) 1054 |
| 2 | 20; V-1 | 57; L-4 | 8; L-G1 | 15; E-1 | | (1) 1456 | (3) 1393 | (6) 1222 |
| 3 | 10; V-1 | 62; L-3 | 8; L-G1 | 20; E-1 | | (1) 1629 | (3) 1473 | (6) 1386 |
| 4 | 20; V-1 | 47; L-3 | 13; L-G1 | 20; E-1 | | (1) 1579 | (3) 1658 | (6) 1597 |
| 5 | 20; V-1 | 52; L-4 | 8; L-G1 | 20; E-1 | | (1) 1466 | (3) 1523 | (6) 1415 |
| 6 | 20; V-1 | 42; L-4 | 18; L-G1 | 20; E-1 | | (1) 1416 | (3) 1489 | (6) 1456 |
| 7 | 10; V-1 | 67; L-4 | 13; L-G1 | 10; E-1 | | (1) 1475 | (3) 998 | (6) 1048 |
| 8 | 20; V-1 | 52; L-4 | 18; L-G1 | 10; E-1 | | (1) 1405 | (3) 1399 | (6) 1329 |
| 9* | 13; V-1 | 39; L-5B | 30; L-G1 | 18; E-1 | | (1) 1387 | (3) 1501 | |
| 10* | 13; V-1 | 29; L-5B | 40; L-G1 | 18; E-1 | | (1) 1279 | (3) 1406 | |
| C1 | — | 45; L-2 | 25; L-G1 | 30; E-2 | | (1) 1310 | (4) 759 | |
| C2 | — | 52; L-2 | 25; L-G1 | 23; E-2 | | (1) 1163 | (4) 349 | |
| C3 | — | 65; L-2 | 12; L-G1 | 23; E-2 | | (1) 1304 | (4) 300 | |
| C4 | — | 52; L-3 | 25; L-G1 | 23; E-2 | | (1) 1515 | (4) 336 | |
| C5 | — | 65; L-2 | — | 23; E-2 | 12; H-G1 | (1) 302 | | |
| C6 | — | 65; L-2 | — | 23; E-2 | 12; H-G2 | (1) 492 | | |
| C7 | — | 52; L-2 | — | 23; E-2 | 25; H-G2 | (1) 450 | | |
| C8 | — | 40; L-2 | 25; L-G1 | 23; E-2 | 12; H-1 | (1) 291 | | |
| C9 | — | 27; L-2 | 25; L-G1 | 23; E-2 | 25; H-1 | (1) 189 | | |
| C10 | 25; V-1 | 50; L-2 | 25; L-G1 | — | | (1) 193 | | |
| C11 | 25; V-1 | 63; L-2 | 12; L-G1 | — | | (1) 162 | | |
| C12 | 20; V-1 | 62; L-4 | 18; L-G1 | — | | (1) 931 | (3) 221 | |
| C13* | — | 52; L-1B | — | 23; E-2 | 25; H-G1 | (1) 321 | (3) 367 | |
| C14* | 13; V-1 | 34; L-5B | — | 18; E-1 | 35; H-G1 | (1) 362 | (3) 396 | |

| | | Peel Strength after being water 'treated' |
|---|---|---|
| 2 | As above | 874 |
| 5 | As above | 782 |

All examples are for laminates of HDPE/Adhesive/Ionomer except those marked *
Examples marked * for laminates of EVOH/Adhesive/Ionomer.

The data in Table 2 illustrate the invention. The first four columns are ingredients of the invention. The first column corresponds to ingredient A/(a), and has a prefix V to indicated that it is what, for descriptive purposes we have called VLDPE. The next column is for ingredient A/(b), and has a prefix L, which for descriptive purposes is referred to as LLDPE or LDPE of comparable density, or blends of the two in which case it has a suffix B. The third column is also ingredient A/(b), and has a prefix L, but the polyethylene is grafted, indicated by the suffix G. The fourth column is for the elastomer, ingredient B, denoted by the prefix E for elastomer. The last column is for HDPE, denoted by the prefix H and, if grafted, with the additional suffix G. HDPE can not form a part of the invention in any significant amount, as discussed above. By using these suffixes and prefixes, together with the percentages of each in the whole composition, it is readily apparent what each composition contains. C before the example number indicates a comparative example outside the invention.

The amounts (a) and (b) as a percentage of component A, as claimed, may readily be calculated. Component A comprises the first three columns, of which (a) is the first column, and (b) the sum of the next two columns.

Testing is done initially after one week. Tests after three, four or six weeks are representative of the adhesives ability to hold up (i.e., not age-down), in the laminate. Values of peel strength above about 800 grams/inch are considered good, and above 1000 grams/inch, very good.

Examples 1 through 10 illustrate the invention. The first eight are for laminates where the adhesive bonds ionomer to HDPE, and the last two where the ionomer is bonded to EVOH. In all cases, failure was between the adhesive and the ionomer, not with the EVOH or HDPE.

The examples have differing amounts of the required polyethylenes and the amount of the required elastomer. Some have conventional LDPE in them (examples 9 and 10). It can be seen, that all of the compositions show excellent adhesion.

Comparative examples C1 through C4 show that when the very low density component A/(a) is not present, while initial peel strength is truly excellent, peel strength drops off disastrously, even after 4 weeks. Compare, for instance, example C1 which has 30% elastomer with example 7 which has only 10% elastomer and 10% very low density polyethylene. Or note the disastrous drop off in example C2 through C4 all with 23% elastomer.

Comparative examples C10 through C12 show that with very low density polyethylene, but without elastomer, initial bonding can be good (C12), or bad (C10 and C11), but drops off disastrously even if adequate initially (C12).

The rest of the comparative examples are for laminates both to HDPE (C5–C9) and EVOH (C13 and C14), of varying compositions, but which had either HDPE or acid grafted HDPE added. Examples C13 and C14 are typical of compositions which are known to provide excellent adhesion between EVOH and polyethylene. However, all compositions have totally unacceptable adhesion to ionomer, even initially. Example C14 has all the required components of the invention, but the presence of HDPE has a disastrous effect.

The laminates of examples 2 and 5, when treated with water at 70 deg. C. still maintain relatively good peel strength, as shown by the data at the bottom of Table 2, indicating utility of these adhesives in 'aggressive' environments.

We claim:

1. A co-extrudable adhesive composition suitable for providing durable bonds to ionomers, comprising:

(A) 70–95 weight %, based on (A) plus (B), of a blend of polyethylene polymers, the blend consisting essentially of:
   (a) 5–40 weight percent, based on (A), of a first polyethylene polymer having a density of 0.86 to below 0.91 g/cc, with the proviso that the heat of fusion, based on differential scanning calorimetry, DSC, is greater than 30 joules/gram, the polymer produced by other than free-radical polymerization;
   (b) 60–95 weight percent, based on (A), of a second polyethylene polymer having a density of 0.910 to 0.935 g/cc; and
(B) 5–30 percent based on (A) plus (B), of a hydrocarbon elastomer having a heat of fusion based on DSC of less than 25 joules/gram;

wherein any portion of (a), any portion of (b) and any portion of (B) may be modified by grafting with a carboxylic acid a carboxylic acid ester, half ester, amide, imide or metal salt, with the proviso that the total weight percent of acid or acid derivative in the final adhesive composition does not exceed 3 weight percent based on the total weight of adhesive composition.

2. The adhesive composition of claim 1, wherein component (a) has a density of from 0.86 to 0.90 g/cc and component B has a heat of fusion of less than 20 joules/gram.

3. The adhesive composition of claim 1 wherein any portion of (a), any portion of (b) and any portion of (B) is modified by grafting with a carboxylic acid or derivative, and the total weight percent of acid or acid derivative in the final adhesive composition is at least 0.05 weight percent.

4. The composition of claim 3 wherein component (b) is acid grafted.

5. A multilayer structure comprising at least one barrier layer bonded to an ionomer layer, using the adhesive of claim 1.

* * * * *